Figure 6:
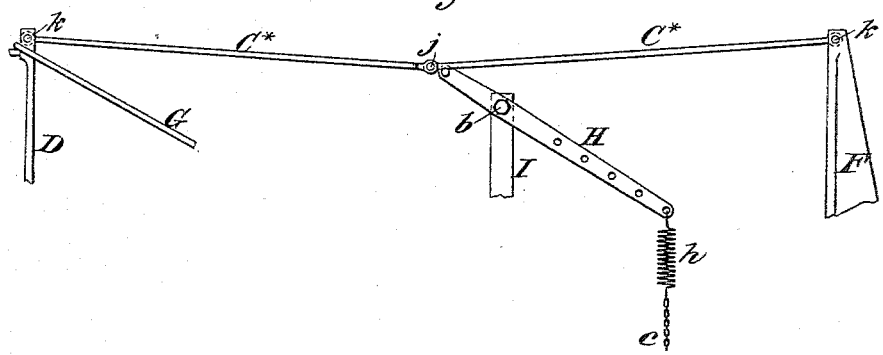

(No Model.) 2 Sheets—Sheet 1.
G. W. BLAKE.
THERMOTIC VALVE CONTROLLER.
No. 388,754. Patented Aug. 28, 1888.
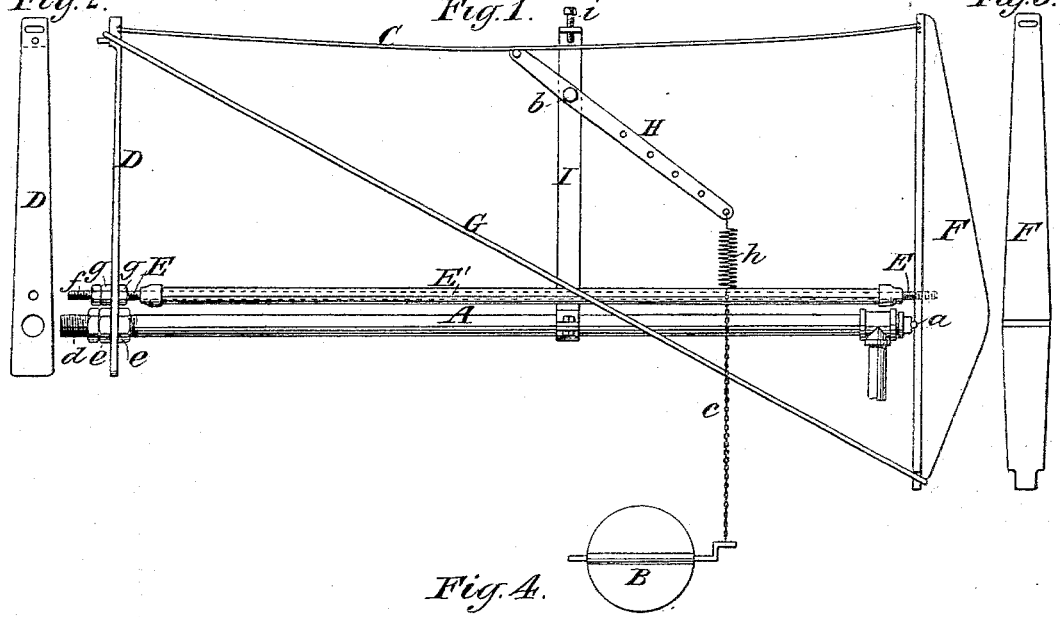
Witnesses:
C. Sundgren.
Joseph W. Roe.
Inventor:
George W. Blake
by attorneys
Brown & Hall (No Model.) 2 Sheets—Sheet 2.
G. W. BLAKE.
THERMOTIC VALVE CONTROLLER.

No. 388,754. Patented Aug. 28, 1888.

UNITED STATES PATENT OFFICE.

GEORGE W. BLAKE, OF NEW YORK, N. Y., ASSIGNOR TO RUTZLER & BLAKE, OF SAME PLACE.

THERMOTIC VALVE-CONTROLLER.

SPECIFICATION forming part of Letters Patent No. 388,754, dated August 28, 1888.

Application filed May 1, 1888. Serial No. 272,472. (No model.)

*To all whom it may concern:*

Be it known that I, GEORGE W. BLAKE, of the city, county, and State of New York, have invented a new and useful Improvement in Thermostats, of which the following is a specification.

This invention is applicable either to steam apparatus or hot-water apparatus for heating houses and other buildings.

The object of the invention is to obtain by the amount of expansion and contraction due to a comparatively small variation of temperature a sufficient movement to produce the effective operation of a damper or other regulating-valve.

The invention consists in the combinations hereinafter described and claimed, of which the principal element is a flexible bar or spring upon which the expansion and contraction of a steam-pipe or hot-water pipe is made to operate lengthwise in such manner as to produce changes in its flexure, whereby the movement necessary to operate the damper or valve is obtained.

In the accompanying drawings, Figure 1 is a side view of a thermostat embodying my invention. Fig. 2 is a face view of one of the supports of the flexible bar or spring. Fig. 3 is a face view of the lever which constitutes the other support for the said bar or spring. Fig. 4 is a side view illustrating the application of the flexible bar or spring in duplex form. Fig. 5 is a side view illustrating another example of the application of the said bar or spring, and Fig. 6 is a side view exhibiting another form of the said bar or spring.

Similar letters of reference designate corresponding parts in all the figures.

A, Fig. 1, designates a portion of a steam or hot-water pipe to which my invention is applied.

B designate a damper, and C the flexible bar, here represented as a buckled spring, by the flexure of which the damper is operated.

D is a support, consisting of a metal arm secured firmly upon the pipe A and serving to support one end of the spring C. To this arm or support D there is secured, very near the pipe A, a rigid rod or bar, E, to the opposite end of which is connected a lever, F, the fulcrum of which is at the end of said bar. The upper arm of this lever constitutes the support for the other end of the spring C, and the lower arm, at a short distance from the fulcrum, has a bearing, a, against the pipe A at a sufficient distance from where the support D is connected with said pipe to give a sufficient length for the expansion and contraction necessary for the operation of the thermostat. The lower arm of said lever is also connected by a rod or link, G, with the support D, the connection between the said link and support being close to the spring C, and the connection of the said rod or link with the lever F being made at a distance farther from the fulcrum than the point a, where the lever bears against the pipe.

As it is desired that the rigid bar E shall be kept as cool as possible, it is represented as surrounded by a tubular jacket, E', between which and the said bar there is an air-space.

H is a lever connected by a rod or chain, c, with the damper. This lever works on a fulcrum, b, which may be in any fixed support, but which is represented as secured in a standard, I, clamped upon the pipe A. The opposite end of this lever to that to which the damper is connected bears against the lower side of the spring C, the buckling or flexure of which is in a downward direction. In order to provide for adjusting the spring C to give it more or less flexure, provision is made for adjusting the arm D on the pipe A by means of a screw-thread, d, on the pipe and nuts e, fitted to said screw-thread on opposite sides of the arm, and there is a similar provision for the adjustment of the bar E and arm D by means of a screw-thread, f, on the said bar and nuts g g, fitted to said screw-thread on opposite sides of the arm.

The operation of this thermostat is as follows: The pipe A expands lengthwise by the increased temperature of steam or water circulating within it, while the bar E remains of approximately fixed length. The pressure produced on the lever F at the point a by the pipe A causes the upper end of said lever where the spring C is supported to move toward the support D, thereby reducing the distance between the ends of the spring and causing its further buckling or downward flexure. This flexure causes the spring to depress the end of the lever H upon which it bears, and so throw up the other end of the said lever and close the damper. This action of the pipe upon the lever F by throwing out the lower end of the said lever will cause the rod or link G to direct the upper end of the arm D, which is flexible enough, toward the upper end of the lever F, and thereby to produce a still greater flexure of the spring, by which a great movement of the damper is obtained by means of a very small expansion of the pipe A. The contraction of the pipe A by reason of a diminished temperature of the water or steam passing through it allows the free end of the arm D and lever F to move apart, and permits the spring to automatically reduce its flexure, which permits the opening of the damper. The opening of the damper may be effected by a weight or spring, as is common, or by the weight of the lever H and its connections with the damper. The spring $h$ represented in the damper-connections $c$ is to prevent any straining of the parts if the expansion of the pipe A should continue after the damper has been closed. The screws $i$ in the standard I is to limit the unbending of the spring C to a point sufficient for the full opening of the damper or valve.

In the example of the invention illustrated by Fig. 4 the parts not represented are supposed to be the same as in the first-described example. The two buckled springs C C' represented in that figure are both supported at the same point in the lever F and arm D, and the flexure of the upper spring being in an upward direction and that of the lower spring being in a downward direction the approach of the points of support in the lever F and arm D causes the springs to further separate at the middle of their length, so that twice the amount of movement of the damper-lever H may be obtained that could be obtained by a single spring. The damper-lever H is pivoted on a fulcrum-pin, $b$, secured upon the upper spring, C', and one end of said lever is connected by a rod, J, with an arm, K, which is rigidly connected with the lower spring, C.

In the example shown in Fig. 5 a single spring is shown, which is supposed to be supported and operated precisely like that shown in Fig. 1; but, instead of its operating on the damper through a lever, it operates it through a chain, L, which passes over a pulley, M, suitably supported.

In the example shown in Fig. 6 the flexible bar, by the flexibility of which the damper or regulating-valve is operated, instead of being a spring or flexible throughout its whole length, as illustrated by Figs. 1, 2, 3, 4, 5, is composed of two inflexible members, C* C*, having a pivoted or flexible joint, $j$. The flexure of this bar will be produced and will operate on the damper in the same way as the buckled spring C; but such flexible bar will require some provision for straightening it or reducing its flexure, as its supports D F are separated by means of the expansion of the pipe A. This is represented as provided for by pivoting it at $k$ $k$ in the said support.

The regulating-valve, that is herein referred to as alternative to a damper, may be the valve of a cold-air box, a valve or cock for turning on gas to be used as fuel, or any valve that will in any way regulate or control a heating apparatus.

What I claim as my invention, and desire to secure by Letters Patent, is—

1. The combination, with a steam or hot-water pipe and a damper or valve, of a support connected with said pipe, a rigid bar having one end connected with said support, a lever having its fulcrum at the other end of said bar and bearing against said pipe, a flexible bar applied lengthwise between said support and lever, and a connection between said flexible bar and the damper or valve, substantially as herein described.

2. The combination, with a steam or hot-water pipe and a damper or valve, of a flexible bar connected with the latter, two supports for the ends of said flexible bar, connected with the pipe at distant points, one of said supports being a lever, against which said pipe expands lengthwise, and a rod or link forming a direct connection between said lever and the other support for the flexible bar, the connection of said rod or link with the lever being on the opposite side of its fulcrum to that on which it supports the flexible bar, substantially as herein described.

3. The combination, with a steam or hot-water pipe and a damper or valve, of a flexible arm connected with said pipe, a rigid bar having one end connected with said arm, a lever having its fulcrum at the other end of said bar and bearing against said pipe, a flexible bar applied lengthwise between one arm of the said lever and the said flexible arm, a connection between the opposite arm of said lever and the said flexible arm, and a connection between said flexible bar and the damper or valve, substantially as herein described.

4. The combination, with a steam or hot-water pipe and a damper or valve, a support connected with said pipe, a rigid bar having one end connected with said support, a lever having its fulcrum at the other end of said bar and bearing against said pipe, and two flexible bars, the flexure of which is in opposite directions, applied lengthwise between said lever and support, of a lever fulcrumed on one of said flexible bars, a connection between said lever and the other of said flexible bars, and a connection between said lever and the damper or valve, substantially as and for the purpose herein described.

GEO. W. BLAKE.

Witnesses:
FREDK. HAYNES,
HENRY J. MCBRIDE.